(12) United States Patent
Thar et al.

(10) Patent No.: US 11,767,771 B2
(45) Date of Patent: Sep. 26, 2023

(54) BRACKET

(71) Applicant: ROLLS-ROYCE plc, London (GB)

(72) Inventors: Jaideep Y. Thar, Derby (GB); Oliver C. Taylor-Tibbott, Lichfield (GB); Andrea L. Ball, Derby (GB)

(73) Assignee: Rolls-Royce plc, London (GB)

( * ) Notice: Subject to any disclaimer, the term of this patent is extended or adjusted under 35 U.S.C. 154(b) by 260 days.

(21) Appl. No.: 17/090,957

(22) Filed: Nov. 6, 2020

(65) Prior Publication Data

US 2021/0140346 A1 May 13, 2021

(30) Foreign Application Priority Data

Nov. 11, 2019 (GB) ...................................... 1916349

(51) Int. Cl.
*F01D 25/28* (2006.01)
*F02C 7/36* (2006.01)
*B33Y 80/00* (2015.01)

(52) U.S. Cl.
CPC ................ *F01D 25/28* (2013.01); *F02C 7/36* (2013.01); *B33Y 80/00* (2014.12); *F05D 2220/323* (2013.01); *F05D 2230/31* (2013.01); *F05D 2240/60* (2013.01); *F05D 2260/30* (2013.01)

(58) Field of Classification Search
CPC . F01D 25/28; F02C 7/36; B22Y 80/00; F05D 2220/323; F05D 2230/31; F05D 2240/60; F05D 2260/30
See application file for complete search history.

(56) References Cited

U.S. PATENT DOCUMENTS

| 5,707,192 A * | 1/1998 | Vortriede | F16B 37/041 411/546 |
| 5,833,417 A | 11/1998 | Sargent et al. | |
| 6,742,756 B1 | 6/2004 | Fimeri et al. | |
| 9,243,657 B2 * | 1/2016 | McCorkell | B60J 5/0468 |

(Continued)

FOREIGN PATENT DOCUMENTS

| EP | 3009746 A1 | 4/2016 |
| EP | 3266993 A1 | 1/2018 |

(Continued)

OTHER PUBLICATIONS

European search report dated Mar. 30, 2021, issued in European patent application No. 20206078.

(Continued)

*Primary Examiner* — Sabbir Hasan
*Assistant Examiner* — Joshua R Beebe
(74) *Attorney, Agent, or Firm* — Shumaker & Sieffert, P.A.

(57) ABSTRACT

A bracket for mounting a first component to a second component, the bracket comprising at least one mounting boss defining a through-hole having an opening axis in axial direction for receiving a fixing used to attach the bracket to one of the first and second components; wherein the mounting boss comprises a fixing support face around the through-hole on a surface of the bracket, the fixing support face configured to bear a head of the fixing; the mounting boss is configured to resist compressive forces exerted on the bracket by the head of the fixing; and the mounting boss comprises a cavity in a space projected from the fixing support face in the axial direction of the through-hole.

19 Claims, 4 Drawing Sheets

(56) References Cited

U.S. PATENT DOCUMENTS

| | | | |
|---|---|---|---|
| 9,841,047 B2* | 12/2017 | Porter | F16B 41/002 |
| 2005/0271492 A1* | 12/2005 | Jackson | F16B 21/076 |
| | | | 411/112 |
| 2007/0125087 A1* | 6/2007 | Callaghan | F02C 7/32 |
| | | | 60/772 |
| 2009/0197724 A1* | 8/2009 | Young | F16B 39/32 |
| | | | 474/133 |
| 2014/0360152 A1 | 12/2014 | Waitkus et al. | |
| 2016/0040538 A1* | 2/2016 | Chen | F01D 5/288 |
| | | | 427/409 |
| 2016/0169046 A1* | 6/2016 | Acius | F01D 25/28 |
| | | | 415/220 |
| 2018/0010524 A1* | 1/2018 | Peace | F01D 25/28 |

FOREIGN PATENT DOCUMENTS

| | | | | |
|---|---|---|---|---|
| EP | 3336333 A1 | 6/2018 | | |
| FR | 2911914 A1 | 8/2008 | | |
| WO | WO-2007064290 A1 * | 6/2007 | | F16B 43/00 |

OTHER PUBLICATIONS

Great Britain Search report dated Feb. 26, 2020, issued in GB Patent Application No. 1916349.2.

Response to Extended Search Report dated Apr. 13, 2021, from counterpart European Application No. 20206078.6, filed Nov. 11, 2021, 47 pp.

* cited by examiner

BRACKET

CROSS-REFERENCE TO RELATED APPLICATIONS

This specification is based upon and claims the benefit of priority from UK Patent Application Number GB 1916349.2 filed on 11 Nov. 2019, the entire contents of which are incorporated herein by reference.

BACKGROUND

Technical Field

The present disclosure relates to a bracket, and in particular a bracket for mounting a payload to a gas turbine engine.

Description of the Related Art

Gas turbine engines typically have a number of payloads mounted thereon. For example, various other components may be mounted to the outside of the gas turbine engine, such as ducting, fairings, or solenoid blocks. It is necessary to secure such payloads to the engine in a secure manner, which is typically done by using a bracket.

Such brackets must be able to withstand the weight of the payloads, as well as withstand external loads, such as vibrating loads, which are applied to both the payload and the engine. Thus, the brackets in known arrangements may be heavy.

It may therefore be desirable to provide improved brackets for mounting payloads to gas turbine engines.

SUMMARY

According to a first aspect there is provided a bracket for mounting a first component to a second component, the bracket comprising at least one mounting boss defining a hole having an opening axis in axial direction for receiving a fixing used to attach the bracket to one of the first and second components; wherein the mounting boss comprises a fixing support face around the hole on a surface of the bracket, the fixing support face configured to bear a head of the fixing; the mounting boss is configured to resist compressive forces exerted on the bracket by the head of the fixing; and the mounting boss comprises a cavity in a space projected from the fixing support face in the axial direction of the hole.

In an arrangement, the cavity surrounds the hole.

In an arrangement, the cavity comprises at least one rib, extending from a surface of the cavity towards the opening axis of the hole.

In an arrangement, the cavity comprises 2, 3, 4 or 5 ribs.

In an arrangement, the at least one rib extends from a proximal end at the surface of the cavity to a distal end adjoining the hole; and the at least one rib comprises projections at the distal end that extend around the hole.

In an arrangement, each projection connects with a projection of the adjacent rib such that the combination of the projections completely surrounds the hole.

In an arrangement, the at least one rib divides the cavity into plural cavity regions.

In an arrangement, the ribs are equally spaced around the opening axis.

In an arrangement, the through-hole is defined by a wall surrounding the hole; and the cavity is arranged radially outward of the wall.

In an arrangement, the bracket comprises at least one opening from the cavity into the hole.

In an arrangement, the bracket comprises at least one opening from the cavity to an external surface of the bracket.

In an arrangement, the bracket comprises at least one opening through the at least one rib.

In an arrangement, the mounting boss is formed in a single manufacturing process that directly forms the hole.

In an arrangement, the mounting boss is formed in a first manufacturing process; and, subsequently, material is removed from the mounting boss to form the hole.

In an arrangement, the mounting boss is integrally formed with the bracket.

In an arrangement, at least one of the mounting boss and the bracket is formed using an additive manufacturing process.

According to an aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft; wherein a first component is mounted to a second component of the gas turbine engine using a bracket according to any one of the preceding claims.

In an arrangement, the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DESCRIPTION OF THE DRAWINGS

Aspects and embodiments of the present disclosure will now be discussed with reference to the accompanying figures. Further aspects and embodiments will be apparent to those skilled in the art.

Figure 1:
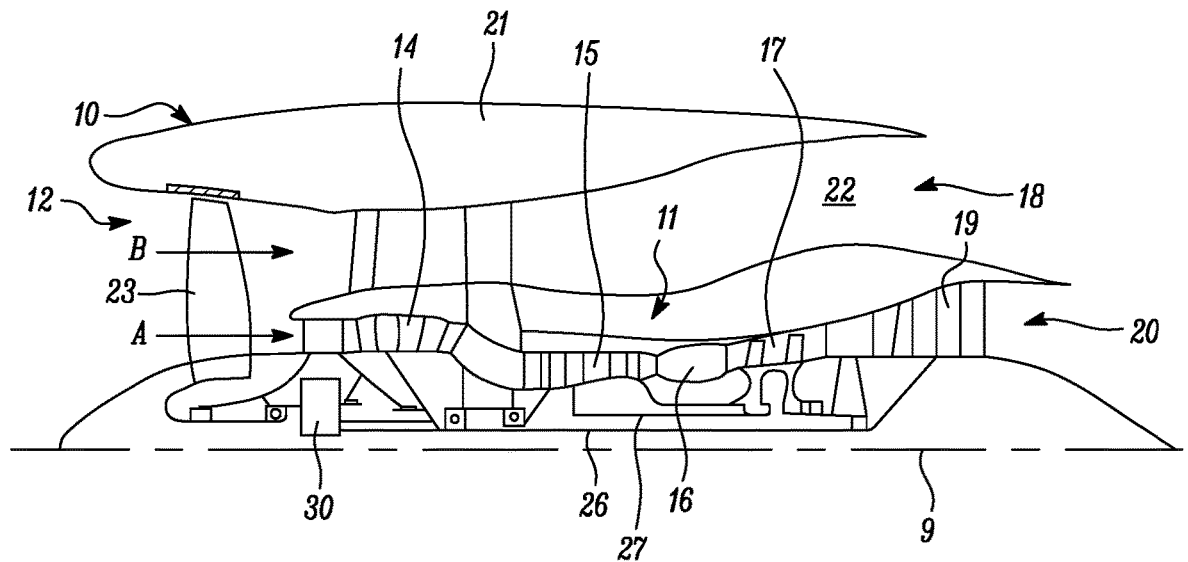
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle. 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
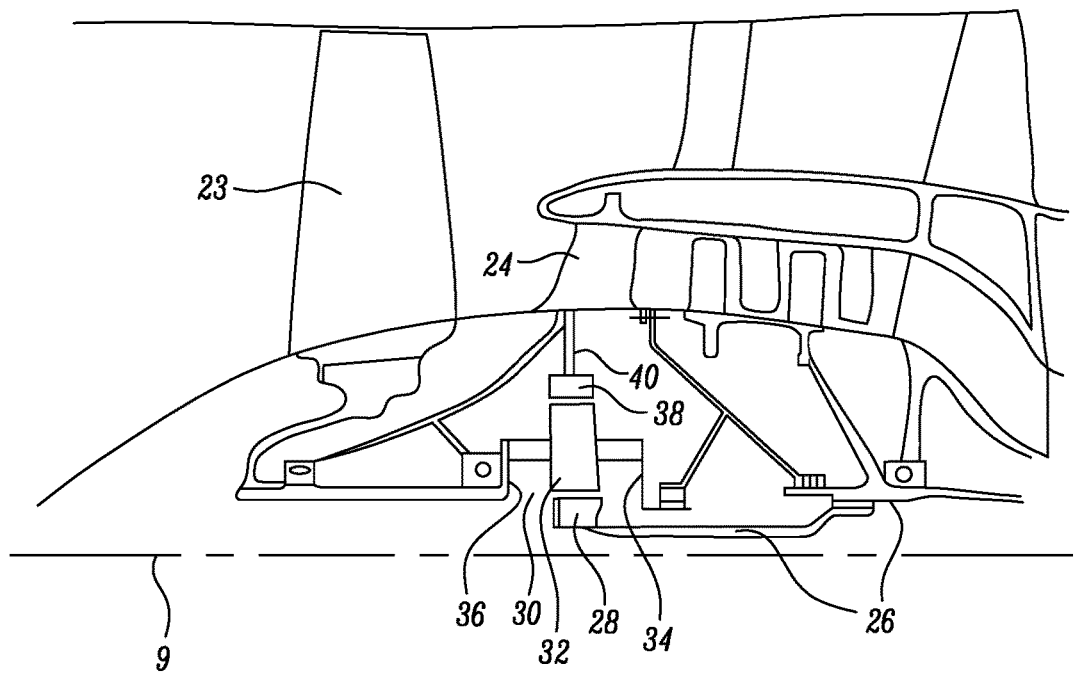
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
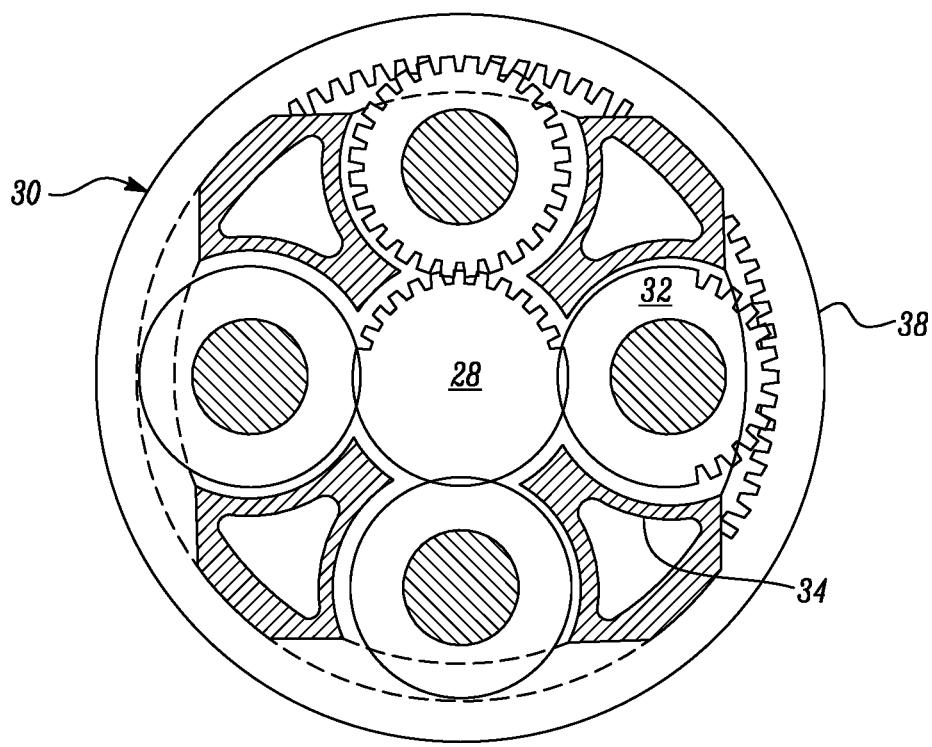
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
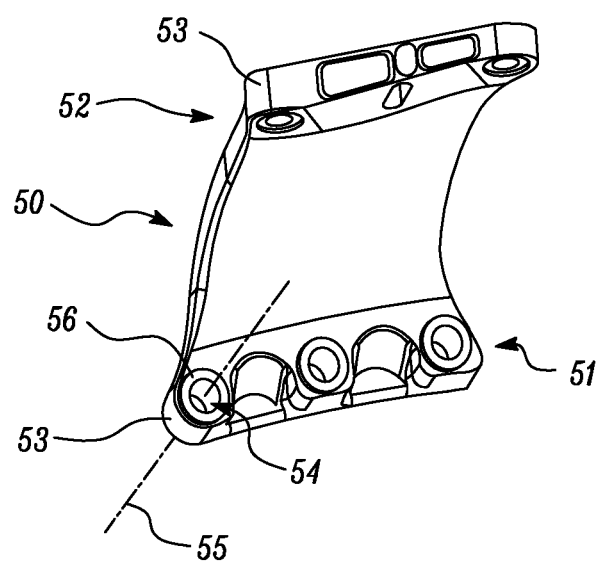
FIG. 4 depicts an example of a bracket.

FIG. 4 depicts an example of a bracket 50 according to the present disclosure. Such a bracket may be used to mount a first component to a second component, for example to mount a payload to a gas turbine engine. In other words, the bracket (when installed) is disposed between the gas turbine engine and the payload and may support the payload so as to attach it to the gas turbine engine.

The payload may be any component that is mounted to the engine. For example, the payload may be a solenoid or valve block, a length of ducting or a fairing. However, the applications of the bracket of the present disclosure are not limited to mounting these components, and one or more such brackets may be used to mount any component to the gas turbine engine and/or to other apparatus.

The bracket 50 may include first and second sections 51, 52, each configured to be connected to a respective component by suitable fixings. Such fixings may include, but are not limited to, bolts and rivets.

One or both of the first and second sections 51, 52 may include one or more mounting bosses 53, configured to receive a fixing. In particular, the mounting boss 53 includes a through-hole 54 that is configured to receive an elongate shaft of a fixing used to secure the bracket 50 to a component. The through-hole 54 defines an opening axis 55 that extends in an axial direction of the through-hole 54. On a surface of the bracket 50, a fixing support face 56 is provided around the through-hole 54.

The fixing support face 56 is configured to bear the head of a fixing. In particular, when a bracket 50 is connected to a component by a fixing, an elongate shaft of the fixing may be inserted in the hole 54, such that the elongate direction of the shaft is parallel to the opening axis 55. In this case hole 54 may be a through-hole. When the fixing is secured, holding the bracket 50 to the component, the fixing exerts a compressive force on the mounting boss 53 and the part of the component to which it is attached. The compressive force is exerted on the mounting boss 53 by the head of the fixing exerting a force on the fixing support face 56. The mounting boss 53 must therefore be sufficiently strong to bear the compressive load required for the fixing to be securely attached.

The mounting bosses 53 may require at least a minimum external diameter in order to provide a sufficiently large fixing support face 56 to support the head of the fixing and/or in order to provide a sufficiently large contact area between the bracket 50 and the component to which the bracket is to be connected.

It has previously been known for mounting bosses to be formed from a solid section of material. This facilitates manufacture and ensures that the mounting boss is sufficiently strong to bear the compressive forces. However, according to the present disclosure, the mounting boss 53 comprises a cavity in a space that is a projection of the fixing support face 56 in the axial direction 55 of the hole 54. In other words, the mounting boss 53, in the region surrounding the hole 54, is not formed from a solid section of material. This may reduce the weight of the mounting boss 53 and therefore reduce the weight of the bracket 50. A reduction in weight, whilst still providing a sufficiently strong bracket 50, may be desirable for a gas turbine engine.

Figure 5:
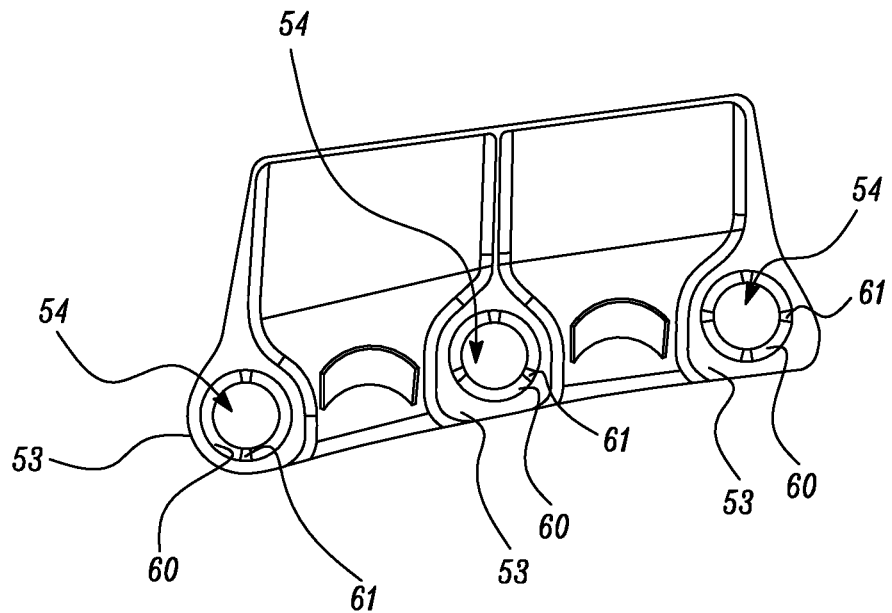
FIG. 5 depicts a portion of a bracket with cut-away sections showing possible configurations of the interior of three mounting bosses.

In an arrangement, the cavity within the mounting boss 53 surrounds the hole 54. FIG. 5 depicts, in cut-though, three examples of arrangements of cavities 60 within mounting bosses 53. It should be appreciated that, although FIG. 5 depicts part of a bracket 50 with three mounting bosses 53 having different arrangements, in practice all of the mounting bosses 53 of a bracket 50 may have the same arrangement. Likewise, any number of the mounting bosses 53 may have a different arrangement from other mounting bosses 53 within a bracket 50.

As shown in the arrangements of FIG. 5, the cavity 60 within the mounting boss 53 may have one or more ribs 61 that extend from a surface of the cavity 60 towards the opening axis 55 of the hole 54. The mounting bosses 53 depicted in FIG. 5 have two, three and four ribs 61, respectively. However, it should be appreciated that other arrangements may be used, for example including five or more ribs.

In an arrangement, the cavity 60 may be configured to be axially symmetric about the opening axis 55 of the hole 54.

In an arrangement having a plurality of ribs 61, the ribs may be evenly spaced around the opening axis 55 of the through-hole, as depicted in FIG. 5. It should be appreciated, however, that alternative configurations, without even spacing of the ribs 61, may be used.

Figure 6:
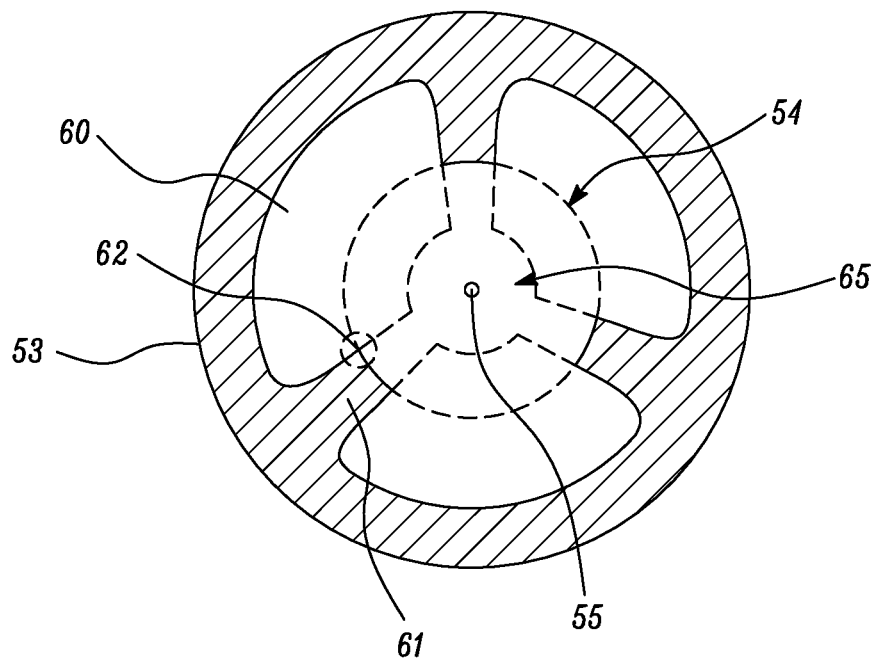
FIG. 6 depicts in cross-section the arrangement of one of the mounting bosses shown in FIG. 5.

FIG. 6 depicts, in cross-section, a mounting boss 53 according to one of the options depicted in FIG. 5. For clarity, the remainder of the bracket 50 and its connection to the mounting boss 53 is not depicted. As shown, in the arrangement depicted in FIG. 6, the mounting boss 53 has a cavity 60 having three ribs 61 extending from a surface of the cavity towards to the opening axis 55 of the hole 54. The cavity 60 may extend to, and not be separated from, the hole 54. In this context, it should be understood that the extent of the hole 54 is determined by the opening within the fixing support face 56 of the mounting boss 53 and its projection in the axial direction 55. This corresponds to the space occupied by the elongate shaft of a fixing when the bracket 50 is connected to a component.

The ribs 61 may extend from the surface of the cavity 60 to the edge of the hole 54, as depicted in FIG. 6. However, in alternative arrangements, the ribs 61 may be shorter. The ribs 61 may function to support compressive loads on the mounting boss 53 created by the clamping force of the fixing. Alternatively or additionally, the ribs 61 may support other elements of the mounting boss 53 during manufacture. For example, the ribs 61 may support the material used to form the fixing support face 56 on the surface of the bracket 50.

Consideration of the requirements of the ribs may determine at least one of the number of ribs 61 to be provided within a mounting boss 53, the length of the ribs 61, namely how far they extend from the surface of the cavity 60 towards the hole 54, and the width of the ribs 61. It should be appreciated that, subject to meeting the functional requirements, it may be desirable to minimise the number and size of the ribs 61 in order to minimise the weight of the mounting boss 53. It should also be appreciated that, although the number and size of the ribs 61 may be constant along the length of the hole 54, this is not essential.

In an arrangement, the edges 62 of the ribs may be rounded. This may prevent burr formation during subsequent processing steps.

In an arrangement, at least one of the bracket 50 and the mounting boss 53 may be formed using an additive manufacturing process. For example, a metal powder bed fusion process may be used. However, it may be appreciated that other processes may also be appropriate. Optionally, the one or more mounting bosses 53 may be integrally formed with the bracket 50.

It should be appreciated that, where the mounting boss 53 is formed from an additive manufacturing process, forming in the mounting boss 53 with the above described cavity 60 may improve the process efficiency. For example, less material may need to be printed or melted. Furthermore, less heat may be generated that is required to be removed from the mounting boss during formation, reducing distortion in the mounting boss 53 as formed and improving conformity to the intended design.

Using such an additive manufacturing process, a mounting boss 53 may be formed in its desired final shape, for example including the hole 54, cavity 60 and any ribs 61. In an alternative arrangement, the mounting boss 53 may initially be formed with a central section of material 65, such as that shown in broken lines in FIG. 6. Subsequently, a machining process may be used to remove the central section of material 65 in order to form the hole 54. Such a two-stage forming process may have the benefit of providing improved accuracy of the formation of the hole 54. On the other hand, directly forming the mounting boss 53 in the desired final configuration, namely with the hole 54 pre-formed, may reduce the number of operations required to form the mounting boss 53 and/or may reduce the risk of forming burrs, which may occur when drilling a hole 54, for example.

Figure 7:
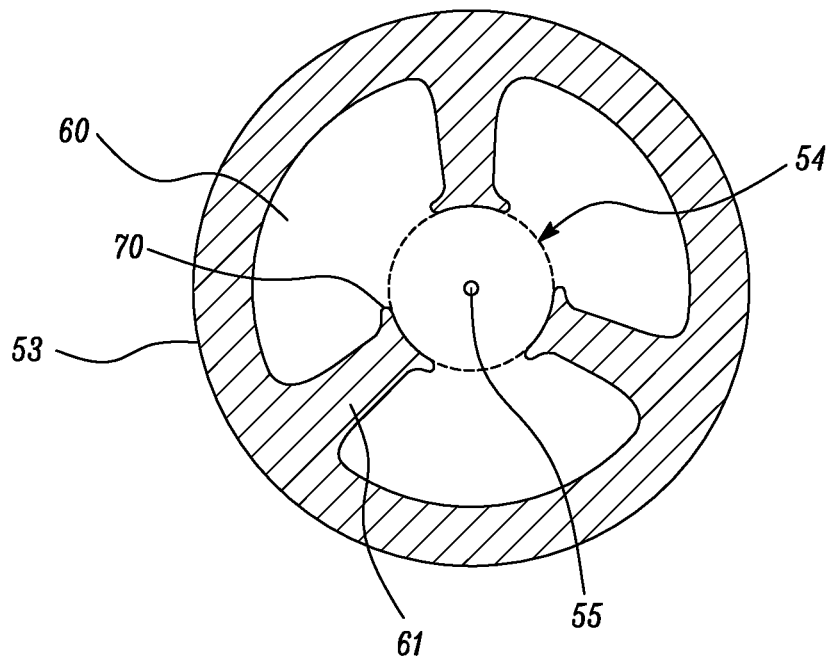
FIG. 7 depicts in cross-section a variation of one of the mounting bosses.

FIG. 7 depicts, in cross-section, a variation of the arrangement of a mounting boss 53 depicted in FIG. 6. As depicted, in this arrangement, each of the ribs 61 may include projections 70 that extend from the distal end of the rib 61, namely the end of the rib 61 closest to the opening axis 55 of the hole 54. The provision of such projections 70 may improve the compressive load-bearing capacity of the mounting boss 53. It should be appreciated that the size and/or shape of the projections 70 may be selected to provide the desired performance characteristics.

Figure 8:
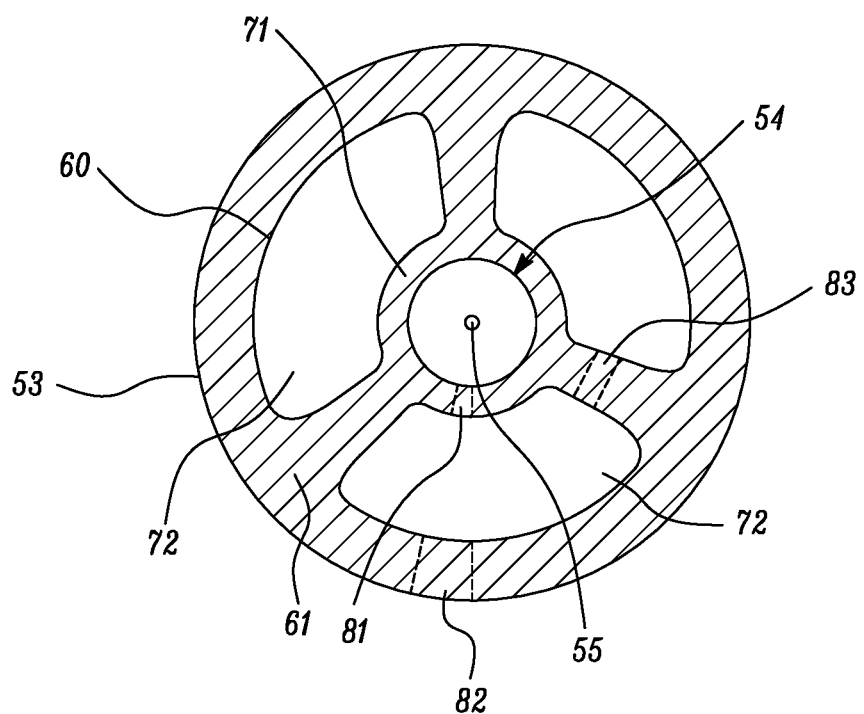
FIG. 8 depicts in cross-section, a further variation of a mounting boss.

In a further variation, depicted in cross-section in FIG. 8, the projections at the end of each rib 61 may extend to a projection extending from an adjacent rib 61. In such an arrangement, the combination of such projections may form a ring 71 of material that completely surrounds the hole 54. In such an arrangement, the cavity 60 may be arranged radially outward relative to the opening axis 55 from the ring 71. In an arrangement such as that depicted in FIG. 8, the cavity 60 may be subdivided by the ribs 61 and the ring of material 71 into cavity regions 72 that are separated from each other.

It will be appreciated that, consistent with the arrangements discussed above, an arrangement such as depicted in FIG. 8, having a ring 71 of material surrounding the hole 54 may have any number of ribs 61. In particular, it should be appreciated that the provision of the ring 71 of material may provide sufficient support for the compressive loads exerted on the mounting boss 53 that no ribs are required. In such an arrangement, the ring 71 of material surrounding the hole 54 may be supported at either end by the surfaces of the mounting boss 53 including, for example, the fixing support face 56. In an alternative arrangement, a single rib may be provided in order to support the ring 71 of material surrounding the hole 54 during manufacture, for example by an additive manufacturing process as discussed above.

In some arrangements, the thickness of projections 70 or of the ring of material 71 may be the same as the thickness of the ribs 61. However, this is not essential and the projections 70, ring of material 71 and/or ribs 61 may have different thicknesses from each other.

It should be appreciated that in order to form the mounting boss 53 using some manufacturing processes, including for example metal powder bed fusion processes, it is necessary to remove unused material from parts of components that are to be voids. In the case of arrangements such as that depicted in FIGS. 6 and 7, such unused material within the cavity 60 may be removed via the hole 54.

In arrangements in which the configuration does not sufficiently facilitate the removal of unused material from the cavity 60 via the hole 54, or potentially precludes it, such as the arrangement in FIG. 8, one or more openings 81 may be provided between the cavity 60 (and/or cavity region 72) and the hole 54. After formation of the mounting boss 53, unused material can be removed from the cavity 60 through the one or more openings 81.

Alternatively or additionally, one or more openings 82 may be provided between the cavity 60 or cavity region 72 and an external surface of the bracket 50 or mounting boss 53. Again, after formation of the mounting boss 53, unused material can be removed from the cavity 60 through the one or more openings 82.

Alternatively or additionally, one or more openings 83 may be provided through one or more of the ribs 61. This may facilitate the removal of material after formation of the mounting boss.

Where plural such openings 81, 82, 83 are provided, they may be appropriately distributed around the cavity 60 in order to efficiently enable the removal of the unused material after formation of the mounting boss 53.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A bracket for mounting a first component to a second component on a gas turbine engine, the bracket comprising at least one mounting boss defining a hole having an opening axis in an axial direction for receiving a fixing used to attach the bracket to one of the first and second components;
    wherein the mounting boss comprises a fixing support face around the hole on a surface of the bracket, the fixing support face configured to bear a head of the fixing;
    the mounting boss is configured to resist compressive forces exerted on the bracket by the head of the fixing; and
    the mounting boss comprises a cavity in a space projected from the fixing support face in the axial direction of the hole and away from the head of the fixing towards whichever of the first or second component into which the fixing projects, such that a region surrounding the hole in the mounting boss is not formed from a solid section of material,
    wherein the cavity comprises at least one rib, extending from a surface of the cavity towards the opening axis of the hole,
    wherein the at least one rib extends to and supports the fixing support face.

2. The bracket of claim 1, wherein the cavity surrounds the hole.

3. The bracket of claim 1, wherein the cavity comprises 2, 3, 4 or 5 ribs.

4. The bracket of claim 1, wherein the at least one rib extends from a proximal end at the surface of the cavity to a distal end adjoining the hole; and the at least one rib comprises projections at the distal end that extend around the hole.

5. The bracket of claim 4, wherein each projection connects with a projection of the adjacent rib such that the combination of the projections completely surrounds the hole.

6. The bracket of claim 1, wherein the at least one rib divides the cavity into plural cavity regions.

7. The bracket of claim 1, wherein the ribs are equally spaced around the opening axis.

8. The bracket of claim 1, wherein the hole is defined by a wall surrounding the hole; and the cavity is arranged radially outward of the wall.

9. The bracket of claim 1, further comprising at least one opening from the cavity into the hole.

10. The bracket of claim 1, comprising at least one opening through the at least one rib.

11. The bracket of claim 1, wherein the mounting boss is formed in a single manufacturing process that directly forms the hole.

12. The bracket of claim 1, wherein the mounting boss is formed in a first manufacturing process; and, subsequently, material is removed from the mounting boss to form the hole.

13. The bracket of claim 1, wherein the mounting boss is integrally formed with the bracket.

14. The bracket of claim 1, wherein at least one of the mounting boss and the bracket is formed using an additive manufacturing process.

15. A gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft;
wherein a first component is mounted to a second component of the gas turbine engine using a bracket according to claim 1.

16. The gas turbine engine of claim 15, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

17. A bracket for mounting a first component to a second component on a gas turbine engine, the bracket comprising at least one mounting boss defining a hole having an opening axis in an axial direction for receiving a fixing used to attach the bracket to one of the first and second components;
wherein the mounting boss comprises a fixing support face around the hole on a surface of the bracket, the fixing support face configured to bear a head of the fixing;
the mounting boss is configured to resist compressive forces exerted on the bracket by the head of the fixing; and
the mounting boss comprises a cavity in a space projected from the fixing support face in the axial direction of the hole and away from the head of the fixing towards whichever of the first or second component into which the fixing projects, such that a region surrounding the hole in the mounting boss is not formed from a solid section of material,
the bracket further comprising at least one opening through an outer radial wall of the cavity to an external surface of the bracket.

18. The bracket of claim 17, wherein the cavity comprises at least one rib, extending from a surface of the cavity towards the opening axis of the hole, and wherein the at least one rib extends to and supports the fixing support face.

19. The bracket of claim 17, wherein material is removed through the at least one opening during manufacturing of the bracket.

\* \* \* \* \*